United States Patent [19]
Connors

[11] Patent Number: 5,347,119
[45] Date of Patent: Sep. 13, 1994

[54] NIGHT VISION DEVICE WITH DUAL-ACTION ARTIFICIAL ILLUMINATION

[75] Inventor: Clifford Connors, Tempe, Ariz.

[73] Assignee: Litton Systems, Inc., Woodland Hills, Calif.

[21] Appl. No.: 83,028

[22] Filed: Jun. 25, 1993

[51] Int. Cl.$^5$ .................... H01J 31/50; H01J 40/14
[52] U.S. Cl. .................. 250/214 VT; 200/17 R
[58] Field of Search ............. 250/214 VT, 330, 333; 313/524, 532; 315/159; 200/11 R, 14, 6 R, 4, 17 R, 18

[56] References Cited

U.S. PATENT DOCUMENTS

| | | | |
|---|---|---|---|
| 3,512,427 | 5/1970 | Metcalf | 200/18 |
| 4,175,221 | 11/1979 | Kellogg | 200/17 R |
| 4,320,267 | 3/1982 | Greve et al. | 200/4 |
| 4,420,072 | 12/1983 | Treffinger et al. | 200/17 R |
| 4,463,252 | 7/1984 | Brennan et al. | 250/214 VT |
| 4,672,194 | 6/1987 | Kastendieck et al. | 250/214 VT |
| 4,755,725 | 7/1988 | Kastendieck et al. | 250/214 VT |
| 4,797,246 | 12/1988 | Kastendieck | 250/214 VT |
| 4,866,219 | 9/1989 | Riding et al. | 200/4 |

Primary Examiner—David C. Nelms
Assistant Examiner—Stephone B. Allen
Attorney, Agent, or Firm—Poms, Smith, Lande & Rose

[57] ABSTRACT

A night vision device with an infrared light usable for covert signaling and reading as well as for illumination of exceedingly dark areas where sufficient ambient light does not exist for the night vision device to provide a view of the area, includes a singular dual-action control switch which allows an operator of the night vision device to operate all of the functions of the device with a singular control. These functions include momentary illumination of the infrared light for signaling and for "quick look" purposes, such as for updating a user's knowledge of map coordinates, for example. The control circuit also allows the infrared light to be maintained on for area illumination, for example, until the user purposely turns it off. However, the momentary illumination feature for the infrared light improves utility of the night vision device for signaling, and improves user safety when "quick look" map reading and area illumination functions are performed because the user is less likely to forgetfully leave the infrared light on, and to thereby reveal the user's position to other personnel equipped with night vision devices. Human factors considerations for operation of the night vision device with minimal training and in stressful situations is improved.

17 Claims, 2 Drawing Sheets

| POSITION | FUNCTION |
|---|---|
| 1 | ALL OFF |
| 2 | NVG ON, IRS OFF |
| 3 | (TRANSITION TO POSITION 4) |
| 4 | NVG ON, IRS LOCKED ON |
| 5 | NVG ON, IRS MOMENTARY ON |

NIGHT VISION DEVICE WITH DUAL-ACTION ARTIFICIAL ILLUMINATION

BACKGROUND OF THE INVENTION

1. Field of the Invention

The present invention relates to night vision devices. More particularly, the present invention relates to night vision devices of the type which removably and relatively movably attach to a support structure secured to a face mask or to a helmet, for example, to thereby be supported in front of at least one eye of the user. As thus supported, the night vision device may be used by the wearer of the helmet or face mask to view a night scene while the user's hands remain free. Still more particularly, the present invention relates to such a night vision device having an infrared light which is not visible to the unaided eye. This light may be used, for example, for covert signaling to other personnel who are equipped with night vision viewers. This infrared light may also be used for map reading and for area illumination, for example, without the aid of illumination which is visible to the unaided eye. When the momentary illumination feature of the infrared light is used for a "quick look" illumination of a map or area, for example, the user's safety is improved because the infrared light cannot be forgetfully left on to reveal the user's position to others with night vision devices. The night vision viewer includes a single control switch which controls both the night vision viewer and the infrared light in both its continuous and momentary illumination.

2. Belated Technology

A conventional night vision device is known as the AN/PVS-7B. This night vision device includes a housing with a single objective lens through which low-level light from a night scene is received. The housing of the conventional AN/PVS-7B also included an image intensifier tube which provides a phosphor green light image representative of the low-level light scene viewed through the single objective lens, an image splitter, and a pair of eye pieces in which a user of the device may view the intensified image with each eye.

The conventional AN/PVS-7B also includes a small infrared spot light which is not visible with the unaided eye, and which may be locked on for area illumination, for example, in an area where natural or other low-level lighting is nonexistent or too dim for the night vision device to provide an image. Such an infrared area illumination may be required, for example, in a building basement or in a tunnel where natural light can not reach, and where artificial illumination visible with the unaided eye is not available. This small infrared spot light is also useful for such purposes as map or sign reading in circumstances where visible illumination would be undesirable. Once this infrared spot light is locked on, it stays on until the user purposely turns it off.

However, experience has shown that users of the conventional AN/PVS-7B too often forgetfully leave the infrared spot light on. This spot light is not visible to the unaided eye. But other possibly hostile personnel with night vision devices can seen this spot light for a distance of several kilometers. Thus, the forgetful leaving on of the infrared spot light of the conventional AN/PVS-7B night vision device may reveal the user's existence and location to other personnel within a wide area.

Additionally, experience has also shown that the small infrared spot light can desirably be used for covert signaling purposes to other friendly personnel who are equipped with night vision devices. That is, hostile personnel who are not equipped with night vision devices will not be able to see the covert signaling. Unfortunately, the conventional AN/PVS-7B night vision device uses a control switch configuration for the infrared spot light which requires that the switch knob be pulled axially and then turned to a detent to illuminate and lock on the infrared spot light. Similarly, in order to extinguish the infrared spot light, the switch knob must be rotated out of the detent position, and pushed axially inward.

Consequently, covert signalling with the conventional AN/PVS-7B night vision device is very awkward. Further, because the axial movements of the switch knob require a considerable and deliberately-applied force, the aiming of the night vision device in a particular direction, as well as its position of placement on the user's head may be upset. Moreover, those who attempt covert signaling with the conventional AN/PVS-7B type of night vision device generally find it necessary to stabilize the device with one hand while the other hand is used to manipulate the knob of the control switch. Understandably, this necessity to use both hands for operation of the night vision device in a convert signaling mode undermines the utility of such a head-mounted device. Users of the head-mounted night vision devices most often want to have at least one hand free for other uses while using the night vision device for viewing or signaling.

Moreover, the same deficiency of the conventional AN/PVS-7B type of night vision device becomes apparent when the user wants to take a quick look at a map, street sign, or other such informative material where additional supplemental illumination from the infrared spot light is desired. The conventional control circuitry and switch do not allow the user to illuminate the infrared spot light, and then to quickly extinguish this light as soon as the necessary information has been glimpsed, and before possibly hostile personnel can take aim on the user.

Other conventional night vision devices have employed an infrared spot light controlled by a momentary contact switch. For example, a conventional night vision device has employed a control switch for the night vision device, and a separate push button type of momentary contact switch for operation of the infrared spot light. With this type of conventional night vision device, the housing integrity of the device is more easily compromised by the entry of dirt and water because both the control switch and the push button switch require individual openings in the housing. Further, operation of the device requires the operator to be familiar with the location and operational requirements of both the control switch and the push button switch. Under stressful conditions, the necessity to locate and operate more than one control or switch on a night vision device can be a decided disadvantage.

SUMMARY OF THE INVENTION

In view of the above, a primary object for the present invention is to provide a night vision device with an infrared supplemental illumination light and a singular dual-action control switch which controls both the operation of the night vision device, and of the infrared spot light for both continuous and momentary illumination.

Another object for the present invention is to provide such an night vision device with an infrared supplemental illumination light which can be turned on momentarily, and which turns off automatically once the user of the device no longer applies a purposeful force to maintain the light on.

Yet another object of the present invention is to provide such a night vision device which allows covert signaling or "quick look" functions to be performed with the infrared supplemental illumination light while requiring the user to use only one hand to manipulate the night vision device.

Still another object of the present invention is to provide the above structural and functional features in an AN/PVS-7B type of night vision device.

Accordingly, the present invention provides a night vision device including a housing which may be suspended relative to a user's head and eyes, the housing having an objective lens admitting low-level light from a night scene, an image intensifier apparatus providing an intensified image representative of the low-level scene, and an eye piece into which the user may look with at least one eye to view the intensified representative image. The night vision device further including an infrared supplemental illumination light, and a singular dual-function control switch for the night vision device and supplemental light which allows the user to purposefully manipulate an external switch feature of the housing in order to momentarily illuminate the supplemental light, the control switch automatically extinguishing the supplemental light once the user discontinues the purposeful manipulation of the switch feature.

Additional objects and advantages of the present invention will appear from a reading of the following detailed description of a single preferred exemplary embodiment of the present invention taken in conjunction with the following drawing Figures, in which:

DESCRIPTION OF THE DRAWING FIGURES

FIG. 1 provides a fragmentary perspective view of a user wearing a helmet carrying a support structure which supports a night vision viewer in front of the user's eyes;

DESCRIPTION OF THE PREFERRED EMBODIMENT

Figure 1:
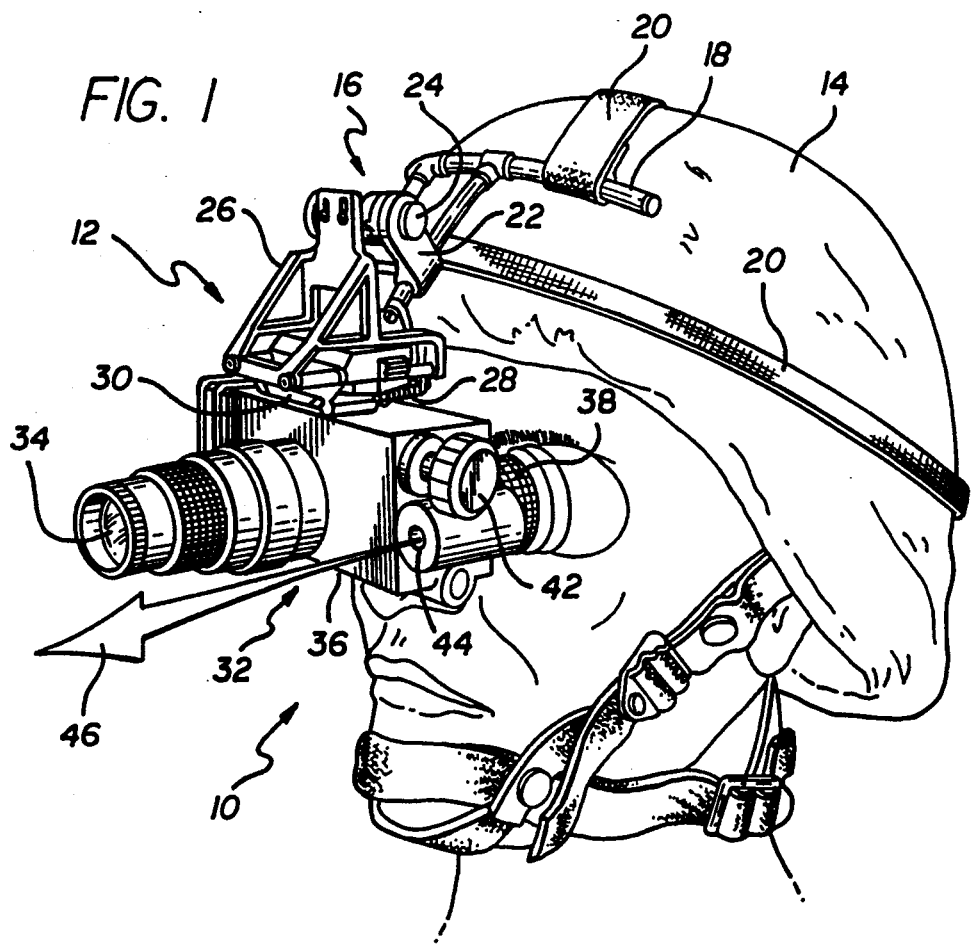
Figure 2:
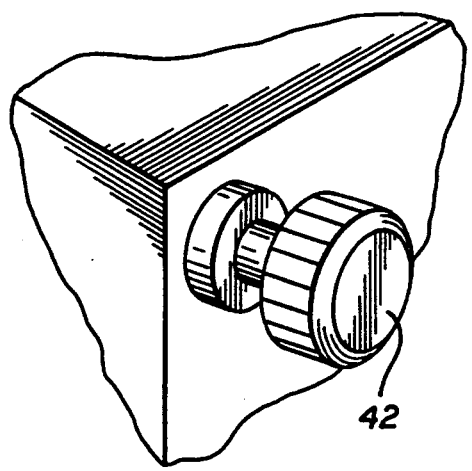
FIG. 2 is a fragmentary view of a portion of FIG. 1, shown at an enlarged scale to better illustrate salient features of the invention.

Referring first to FIGS. 1, and 2 in conjunction, an operator 10 is shown using a night vision device 12. The operator 10 wears a helmet 14 carrying a support structure portion 16 of the night vision device 12. This support structure 16 includes a frame 18 secured to the helmet 14 with various straps 20 and having a forwardly and upwardly extending clevis 22. The clevis 22 carries a hinge pin 24 (best seen in FIG. 2) for a flip up mount portion 26 of the support structure 16. Consequently, the flip up mount portion 26 of the support structure 16 is hinged on the clevis 22 for pivotal movement about hinge pin 24. The flip up mount portion 26 carries a carriage 28 and a coupling device 30. A night vision viewer 32 is suspended from the support structure 16 at the coupling device 30. This night vision viewer 32 is of goggle configuration and includes a single objective lens 34, a housing 36, and a pair of eye pieces 38 aligned with respective eyes of the operator 10.

To use the night vision viewer 32, the operator 10 places it in the use position depicted in FIGS. 1, and looks into eye pieces 38 to see an enhanced image representative of the low-level light from a night time scene which has entered objective lens 34. As those ordinarily skilled in the pertinent arts will appreciate, the night vision viewer 32 includes a power supply in the form of an internal battery pack (not visible in the drawing Figures). Internally of the night vision viewer, a power supply circuit provides power to an image intensifier tube, which is well known in the pertinent arts, and which supplies to the eye pieces 38 an intensified image in phosphor yellow-green light of the night time scene viewed via the objective lens 34.

FIGS. 1 and 2 illustrate that the night vision viewer 32 includes a dual-function control switch 40 (seen in FIG. 4), the external control knob 42 for which is visible on the outside of the housing 36. This switch knob 42 forms a part of the housing 36. Also, salient control functions for the switch 40 are tabulated in FIG. 3. In this table of FIG. 3, the viewer 32 is referred to as a night vision goggle, and is abbreviated "NVG". Similarly, an infrared spot light 44 is referred to as an infrared source, and is abbreviated as, "IRS". FIG. 2 diagrammatically illustrates the physical manipulations for switch knob 42 which are necessary to effect the indicated control functions. More particularly, viewing FIGS. 2 and 3, it is seen that the control knob has an initial position (#1) in which all of the night vision viewer 32, including the infrared spot light 44, is turned off. In a second position (#2) for the knob 42, the night vision viewer is turned on. That is, the image intensifier tube of the viewer 32 is powered so that the user 10 can view an intensified image in phosphor yellow-green light at the eye pieces 38. The user 10 effects the change from turned off to turned on for the night vision viewer 32 preferably by rotating the switch knob 42 through an angle of thirty degrees from position #1 to position #2, as seen in FIG. 2.

Figures 3, 4:
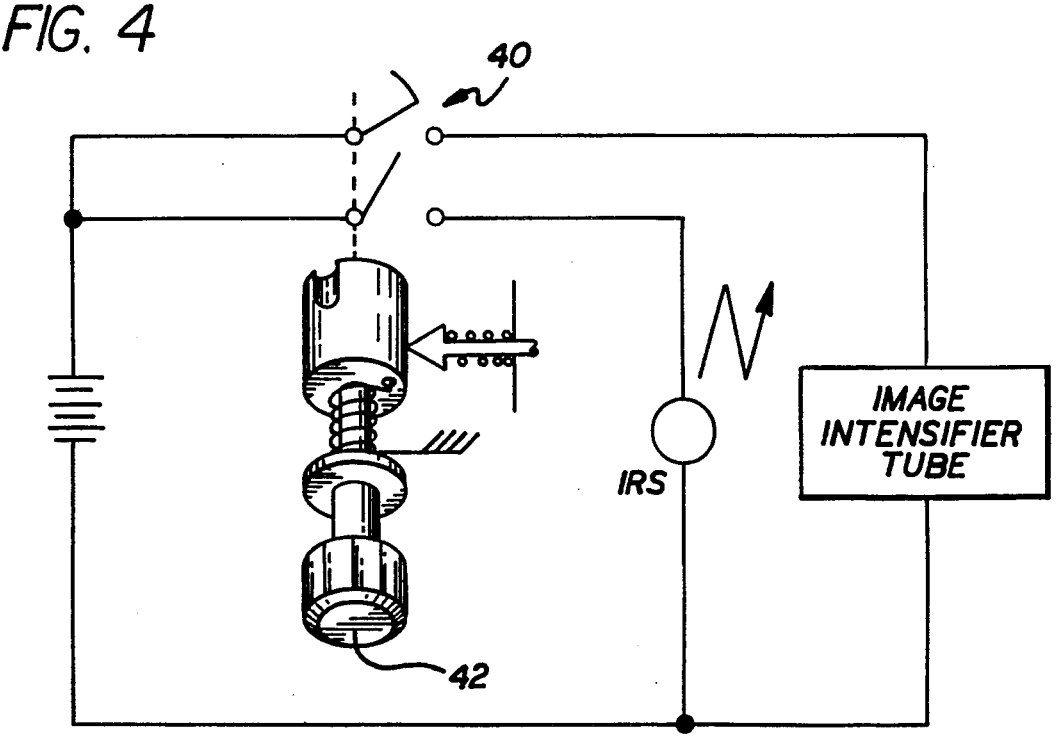
FIG. 3 is a table showing operative conditions of the night vision device illustrated in FIGS. 1 and 2.
FIG. 4 schematically provides an electrical circuit diagram of a control circuit in the night vision device seen in FIGS. 1 and 2.

On the other hand, in this second position for the switch knob 42, the supplemental infrared spot light 44 is off. In order to turn on the infrared spot light 44, the operator may conventionally pull the knob 42 axially to a position indicated with the numeral #3 on FIG. 2, and then rotates the knob 42 further in the same rotational direction which was used in moving the knob from position #1 to position #2 until the knob reaches a detent position indicated with the numeral #4 on FIG. 2. Preferably, an additional thirty degree rotation of the knob 42 is necessary to reach position #4 from position #2. When the knob 42 is placed in the switch position indicated with numeral #4 on FIG. 2, an infrared beam, indicated on FIG. 1 with the arrow 46 issues forwardly from the light 44 to illuminate an area in the field of view of the objective lens 34. As is indicated by the table of FIG. 3, the infrared spot light 44 is locked on when the switch knob 42 is placed in the position #4. In order to extinguish the spot light 44, the operator 10 must turn the knob 42 from the detent position #4 to position #3, and then push the knob axially to position #2. This action extinguishes the spot light 44, and leaves the night vision portion of the viewer 32 in operation.

Experience has shown that even though the viewer 32 includes a warning indicator visible through the eye pieces 38 to show that the spot light 44 is on, operators will sometimes forget to turn off the spot light. While this infrared spot light is not visible to the unaided eye, for other personnel in the area of the user 10 who are also equipped with night vision devices, the spot light 44 is clearly visible for a distance of several kilometers. Also, as explained above the conventional actuation movements for knob 42 are very inconvenient for purposes of "quick look" uses and for covert signaling with the spot light 44.

Accordingly, the switch 40 provides another position of momentary contact for the spot light 44, which position is indicated with #5 on the table of FIG. 3, and on the graphic of FIG. 2. This momentary contact position #5 for the knob 42 is located in the same plane as the positions #1, and #2. That is, no axial movement for the knob 42 is required to access the position #5. The operator 10 accesses switch position #5 simply by twisting the knob 42 through an additional angular movement, indicated with the numeral 48 on FIG. 2, beyond the on positions #2. This position of momentary contact for the spot light 44 leaves the night vision portion of the viewer 32 in operation, and causes the infrared beam 46 to issue forwardly, as described above. Preferably, the angular movement necessary to effect momentary illumination of the spot light 44 (indicated on FIG. 2 with the numeral 48) is an additional thirty degrees beyond position #2, just like that necessary to access position #4. However, as soon as the operator discontinues angular twisting on the knob 42, an internal spring of the switch 40 returns the switch to the condition #2. That is, the internal detent of the switch 40 is not engaged in position #5. This return of switch 40 to condition #2 leaves the night vision viewer on, but immediately extinguishes the infrared spot light 44.

In the use environment for the night vision viewer 32, the advantages of being able to carry out covert signaling and to take a quick look at a map or other informational material, for example, without having to be at all concerned with the necessity for deliberate conduct to turn off the infrared spot light 44 cannot be over stated. At the very least, forgetting to turn off the infrared spot light 44 can result in significantly shortened battery life for the viewer 32. At worst, a simple act of forgetfully leaving the spot light 44 on can have catastrophic results for the operator 10 and for other friendly personnel. Also, the singular dual-action switch 40 with a singular control knob 42 allows the operator 10 to operate all the functions of the night vision device with a single control. That is, the operator need not remember the location and operational requirements of plural controls or switches in order to fully utilize the capabilities of the night vision device 32.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. For example, while the present invention is illustrated and depicted in the context of an AN/PVS-7B type of night vision device, the invention is equally applicable to other types of night vision devices. Particularly, head-mounted night vision devices seek to free the operator's hands. In this interest, the present invention requires the operator to devote only one hand to covert signaling, and to "quick look" operation of the infrared spot light of the night vision device. Accordingly, the present invention is equally applicable to other types of night vision devices, and especially to those head-mounted types which conventionally require two hands for the operator to effect signaling or "quick look" operation. It follows necessarily that the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

I claim:

1. A night vision device comprising:
a housing which may be suspended relative to a user's head and eyes, the housing having an objective lens admitting low-level light from a night scene, an image intensifier apparatus providing an intensified image representative of the low-level night scene, and an eye piece into which the user may look with at least one eye to view the intensified representative image;
an infrared supplemental illumination light; and
a singular dual-action control switch for both the image intensifier apparatus and the supplemental light which allows the user to selectively choose between a first mode of switch operation in which the user may purposefully manipulate an external switch feature of the housing in order to momentarily illuminate the supplemental light, the switch automatically extinguishing the supplemental light once the user discontinues manipulation of the switch feature, and a second mode of switch operation in which the supplemental illumination light may be locked on.

2. The night vision device of claim 1 wherein said device is of the AN/PVS-7B type.

3. The night vision device of claim 1 wherein said singular dual-action control switch controls both the image intensifier apparatus, and the supplemental infrared light in response to successive rotary motions of said external housing switch feature.

4. The night vision deice of claim 3 wherein said control switch includes a first operative position in which said image intensifier apparatus of said night vision device and said infrared supplemental illumination light are both off, and a second operative position in which said image intensifier apparatus alone of said night vision device is turned on.

5. The night vision device of claim 4 wherein said second operative position of said switch is reached by rotation without axial relative movement of said external switch feature form a respective first position therefor in a plane to a second position for said external switch feature.

6. The night vision device of claim 5 wherein said switch includes another operative position of momentary illumination for said infrared supplemental light, said another position of said switch being reached by rotation of said external switch feature beyond said second position and in the plane of said first and second positions.

7. The night vision device of claim 6 in which said switch further includes a spring yielding to allow said switch to be placed in said another operative position, said spring returning said switch to said second operative position upon discontinuation of said purposeful manipulation of said external switch feature, and extinguishing said infrared supplemental illumination light.

8. The night vision device of claim 6 wherein said switch further includes a third operative position in which said night vision device and said supplemental infrared light are both maintained turned on, said third operative position of said switch being reached by axial movement of said external switch feature.

9. The night vision device of claim 8 wherein said third operative position of said switch is reached by additionally rotating said external switch feature in a second plane displaced axially from the first-recited plane.

10. The night vision device of claim 8 wherein said third operative position for said switch includes a detent maintaining said night vision device and said infrared supplemental illumination light both turned on.

11. A night vision device of the AN/PVS-7B type comprising:
   a housing having an objective lens for receiving low-level light from a night scene, an image intensifier tube for receiving the low-level light and providing an intensified image representative of the night scene, and an eye piece in which said intensified image is visible;
   an infrared supplemental illumination light carried by said housing and when turned on forwardly projecting an illuminating beam of infrared light which is visible with the night vision device;
   a singular dual-action control switch for controlling both the image intensifier tube of said night vision device and the infrared supplemental illumination light, said control switch including a control feature sequentially rotatable in a plane between bi-stable first and second positions, and a third momentary-contact position for respectively effecting: all off, image intensifier tube on, and image intensifier tube on along wit momentary supplemental infrared illumination; and
   wherein said switch feature further includes a forth operative position in which said infrared supplemental illumination light is locked on, said forth operative position being reached by axially moving said switch control feature.

12. The AN/PVS-7B type of night vision device of claim 11 wherein said forth operative position for said switch is reached by further rotating said switch feature away from said second position therefor after effecting said axial movement of said switch feature.

13. The AN/PVS-7B type of night vision device of claim 12 wherein said infrared supplemental illumination light is extinguished by rotating said switch feature from said forth position, and axially moving said switch feature back to said second position to maintain said night vision turned on while extinguishing the infrared supplemental illumination light.

14. The AN/PVS-7B type of night vision device of claim 13 wherein said rotational movements of said switch feature between successive switch positions are each of substantially the same angular extent.

15. The AN/PVS-7B type of night vision device of claim 14 wherein said angular extent of said rotational movements of said switch feature are substantially thirty degree angular movements.

16. A method of safely providing momentary supplemental infrared illumination light for a user of a night vision device, said method including the steps of:
   providing a supplemental infrared spot light on the night vision device; p1 providing a singular dual-action control switch on the night vision device which controls both the night vision function of the device as well as having both a momentary contact feature and a locked-on feature for controlling the illumination of the supplemental infrared illumination light;
   illuminating the supplemental infrared light while a user of the night vision device actuates said momentary contact feature of said switch;
   automatically extinguishing the infrared supplemental illumination spot light immediately upon the user discontinuing actuation of said momentary contact feature of said switch;
   illuminating the supplemental infrared illumination light continuously after said user places said control switch in a locked-on position; and
   extinguishing the infrared supplemental illumination light upon said user placing said control switch out of said locked-on position.

17. The method of claim 16 wherein providing said singular control switch includes the step of configuring said switch to have successive rotational positions of: all off, night vision on, and night vision on with infrared spot light momentarily on, and wherein providing said singular control switch includes the step of configuring said switch to have an additional locked-on position of continuous illumination for said infrared spot light, which additional position is reached from said "night vision on" position by axial motion of a switch feature followed by a rotational movement to a position congruent to said infrared spot light momentary on position.

* * * * *